US010745959B2

(12) United States Patent
Iino et al.

(10) Patent No.: US 10,745,959 B2
(45) Date of Patent: Aug. 18, 2020

(54) TOUCH SENSOR UNIT

(71) Applicant: Mitsuba Corporation, Gunma (JP)

(72) Inventors: Akihiro Iino, Gunma (JP); Mitsuhiro Okada, Gunma (JP); Kenta Onodera, Gunma (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 134 days.

(21) Appl. No.: 15/606,010

(22) Filed: May 26, 2017

(65) Prior Publication Data

US 2017/0342762 A1    Nov. 30, 2017

(30) Foreign Application Priority Data

May 31, 2016   (JP) ................ 2016-109015

(51) Int. Cl.
| | |
|---|---|
| *E05F 15/75* | (2015.01) |
| *E05F 15/44* | (2015.01) |
| *G01D 11/24* | (2006.01) |
| *G01D 5/165* | (2006.01) |

(52) U.S. Cl.
CPC .............. *E05F 15/75* (2015.01); *E05F 15/44* (2015.01); *G01D 5/165* (2013.01); *G01D 11/245* (2013.01); *E05Y 2400/654* (2013.01); *E05Y 2600/526* (2013.01); *E05Y 2900/532* (2013.01); *E05Y 2900/546* (2013.01)

(58) Field of Classification Search
CPC ........... E05F 15/75; E05F 15/44; E05F 15/70; G01D 5/165; G01D 11/245; H01B 7/104; H01H 3/142
See application file for complete search history.

(56) References Cited

U.S. PATENT DOCUMENTS

| | | | | |
|---|---|---|---|---|
| 6,316,846 B1 * | 11/2001 | Kashiwazaki | ......... | H01B 7/104 200/508 |
| 6,772,559 B1 * | 8/2004 | Bouamra | ................ | G01L 1/242 49/26 |
| 7,714,595 B2 * | 5/2010 | Fujiwara | .............. | G01D 5/2405 324/663 |

(Continued)

FOREIGN PATENT DOCUMENTS

| | | |
|---|---|---|
| JP | 2009046038 A | 3/2009 |
| JP | 2013-228299 A | 11/2013 |

(Continued)

*Primary Examiner* — Douglas X Rodriguez
*Assistant Examiner* — Brent J Andrews
(74) *Attorney, Agent, or Firm* — McCormick, Paulding & Huber PLLC (57) ABSTRACT

In a touch sensor unit, a bracket body is provided with a first protruding portion which is disposed on a vehicle interior side of a base portion, a gap portion is provided between the first protruding portion and the base portion, the height from the bracket body to the distal end of the first protruding portion is smaller than the height from the bracket body to the sensor portion. Therefore, when the sensor portion and the base portion are elastically deformed by contact with a blockage, the elastically deformed sensor portion and base portion enter the gap portion, thereby preventing the sensor portion and the base portion from being pressed against the corner portion of the bracket without increasing the rigidity of the sensor portion and the base portion.

5 Claims, 10 Drawing Sheets

(56) References Cited

U.S. PATENT DOCUMENTS

2011/0047879 A1\* 3/2011 Shimizu .................. E05F 15/44
49/358

FOREIGN PATENT DOCUMENTS

| JP | 2013228299 A | \* | 11/2013 | | |
|---|---|---|---|---|---|
| JP | 2014216300 A | | 11/2014 | | |
| WO | WO-2015194030 A1 | \* | 12/2015 | ................ | B60J 5/00 |

\* cited by examiner

TOUCH SENSOR UNIT

CROSS-REFERENCE TO RELATED APPLICATION

The present application claims priority from Japanese Patent Application No. 2016-109015 filed on May 31, 2016, the content of which is hereby incorporated by reference into this application.

TECHNICAL FIELD OF THE INVENTION

The present invention relates to a touch sensor unit which is used for detection of contact with a blockage.

BACKGROUND OF THE INVENTION

Conventionally, an automatic opening and closing apparatus provided for vehicle such as automotive vehicle has: an opening and closing element which opens and closes an opening portion; an electric motor which drives the opening and closing element; and an operation switch which turns on or off the electric motor. When an operator operates the operation switch, the electric motor is driven so as to open or close the opening and closing element, and the automatic opening and closing apparatus drives the opening and closing element on the basis of not only operation of the operation switch but also other operation conditions.

For example, the automatic opening and closing apparatus uses a touch sensor unit to detect that a blockage is caught between the opening portion and the opening and closing element. The touch sensor unit is fixed to the opening portion or the opening and closing element, and configured to detect the contact with a blockage. Additionally, the automatic opening and closing apparatus opens the opening and closing element under closing operation, or stops the opening and closing element under closing operation on the spot, regardless of the operation of the operation switch, on the basis of a detection signal input from the touch sensor unit.

Patent Document 1 discloses one example of a touch sensor unit which is used for such an automatic opening and closing apparatus. A foreign object detection sensor (touch sensor unit) disclosed in Patent Document 1 has an elongated string-like sensor portion and an elongated holding member which internally holds the sensor portion. The holding member has: a housing portion in which the sensor portion is housed; and a wide attaching portion for attaching the sensor portion to a bracket. The holding member is positioned with respect to the bracket by abutment of an abutment surface of the attaching portion on a positioning surface of the bracket.

RELATED ART DOCUMENTS

Patent Documents

Patent Document 1: Japanese Patent Application Laid-Open Publication No. 2013-228299

SUMMARY OF THE INVENTION

However, the touch sensor unit disclosed in the above Patent Document 1 is configured such that, when a blockage comes into contact with the holding member to deform it, the holding member is pressed against a corner portion of a positioning projection forming the positioning surface. Accordingly, if, for example, a blockage strikes the holding member, the corner portion may damage the holding member. Under this circumstance, the rigidity of the holding member may be increased to prevent the holding member from being damaged. Simply increasing the rigidity of the holding member, however, may decrease the sensitivity of the touch sensor unit, thus posing another problem.

It is an object of the present invention to provide a touch sensor unit which can suppress damage due to contact with a blockage without being reduced in sensitivity.

According to one aspect of the present invention, there is provided a touch sensor unit which is used for detection of contact with a blockage, comprising: a hollow sensor portion which is elastically deformed by an external load; electrodes which are provided inside the sensor portion, and brought into contact with each other by elastic deformation of the sensor portion; an elastic base portion integrally provided with the sensor portion, the elastic base portion extending along a longitudinal direction of the sensor portion; an attachment body to which the elastic base portion is attached; a protruding portion provided to the attachment body and disposed on one side of the elastic base portion; and a gap portion provided between the protruding portion and the elastic base portion, wherein a height from the attachment body to a distal end of the protruding portion is smaller than a height from the attachment body to the sensor portion.

In the touch sensor unit according to another aspect of the present invention, a width of the sensor portion along a direction intersecting with a height direction of the protruding portion may be smaller than a width of the elastic base portion along a direction intersecting with the height direction of the protruding portion, and an inclined surface may be provided between the sensor portion and the elastic base portion.

In the touch sensor unit according to another aspect of the present invention, a fixing object may be a vehicle body or an opening and closing element of a vehicle, a protruding portion may be provided on the other side of the elastic base portion of the attachment body, the protruding portion on one side may be disposed on a vehicle interior side, and the protruding portion on the other side is disposed on a vehicle exterior side, and the protruding portion on one side may be larger in height than the protruding portion on the other side.

In the touch sensor unit according to another aspect of the present invention, a distal end of the protruding portion on the other side may be provided with a tapered surface inclined from the vehicle exterior side of the protruding portion on the other side toward a distal end side of the protruding portion on one side.

In the touch sensor unit according to another aspect of the present invention, the attachment body may be a bracket fixed to a fixing object.

According to the present invention, the attachment body is provided with a protruding portion which is disposed on one side of the elastic base portion, the gap portion is provided between the protruding portion and the elastic base portion, and the height from the attachment body to the distal end of the protruding portion is smaller than the height from the attachment body to the sensor portion. Therefore, when the sensor portion and the elastic base portion are elastically deformed upon contact of a blockage, the elastically deformed sensor portion and elastic base portion enter the gap portion. This makes it possible to prevent the sensor portion and the elastic base portion from being pressed against the corner portion of the attachment body as in the above case without increasing the rigidity of the sensor portion or elastic base portion. It is therefore possible to prolong the service life of the touch sensor unit by preventing the sensor portion and the elastic base portion from being damaged without decreasing the sensitivity.

DESCRIPTION OF THE PREFERRED EMBODIMENTS

Hereinafter, the first embodiment of the present invention will be described in detail with reference to the drawings.

Figure 1:
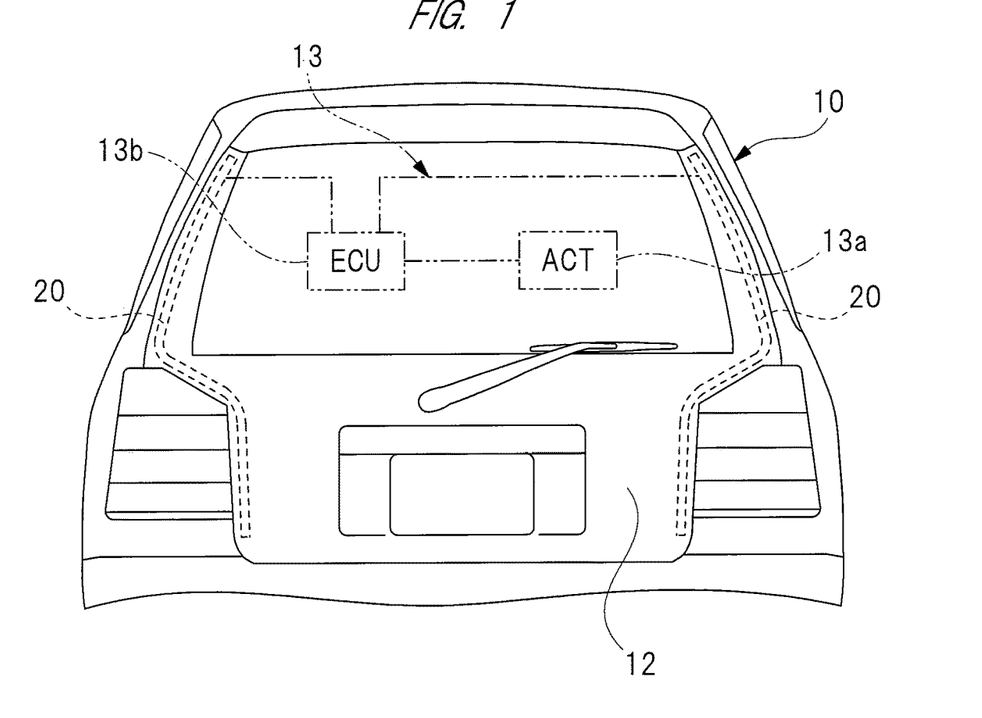
FIG. 1 is a front view of a tail gate including touch sensor units.
Figure 2:
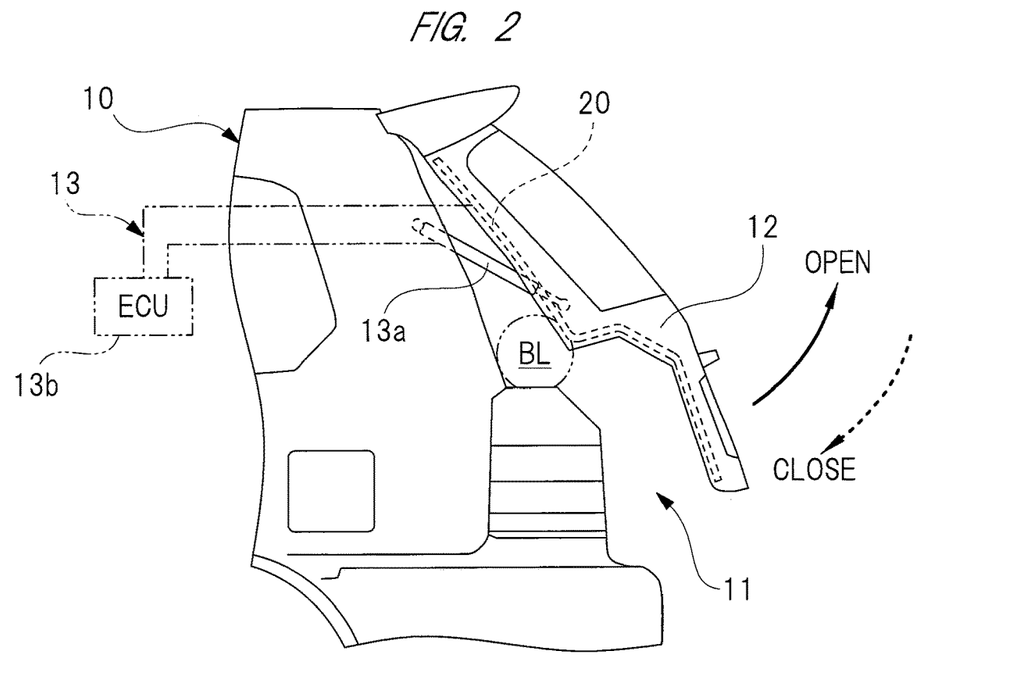
FIG. 2 is a side view of a rear side of a vehicle in FIG. 1, from a lateral side of the vehicle.
Figure 3:
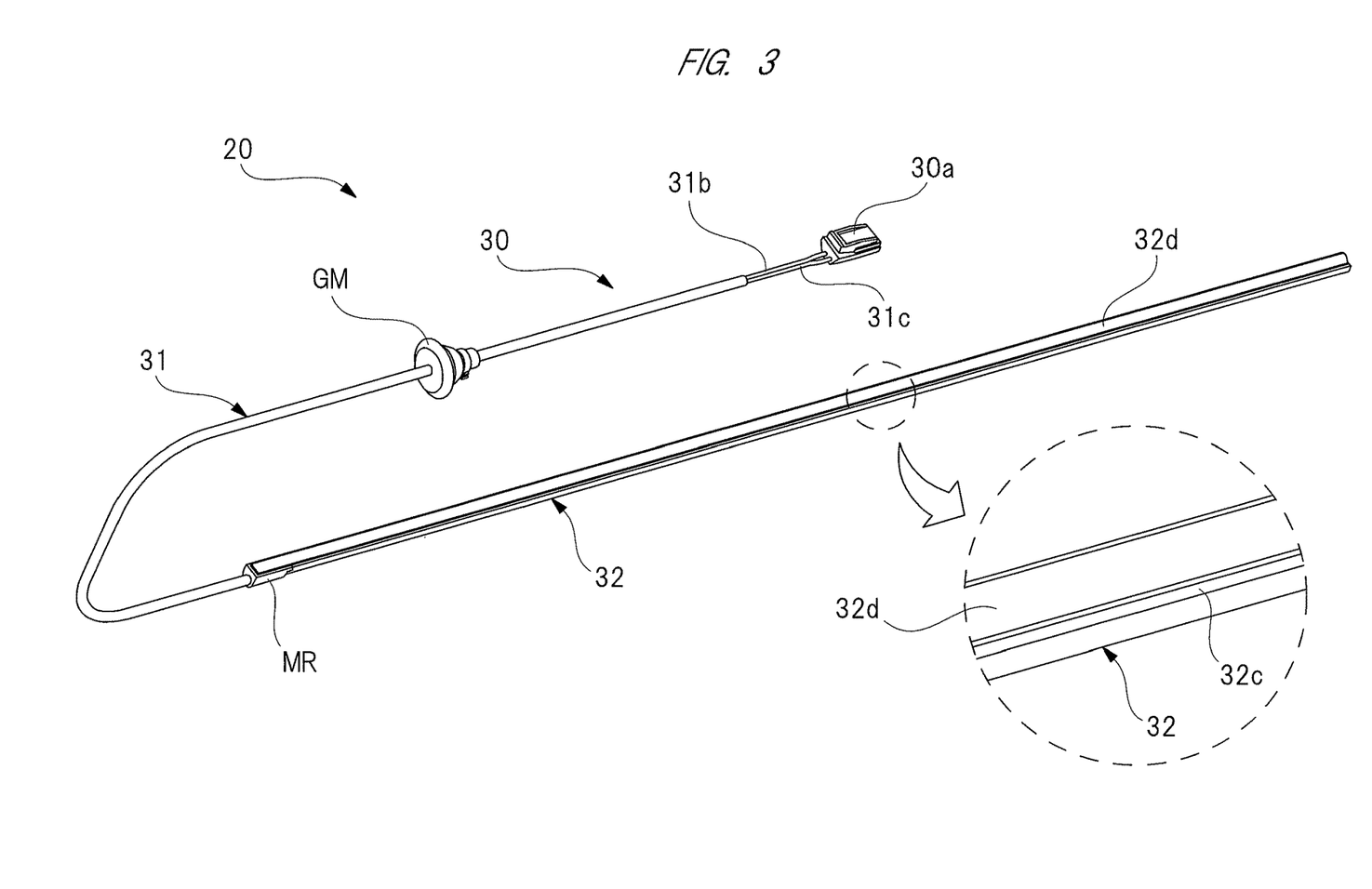
FIG. 3 is a perspective view showing a base end side of a sensor body.
Figure 4:
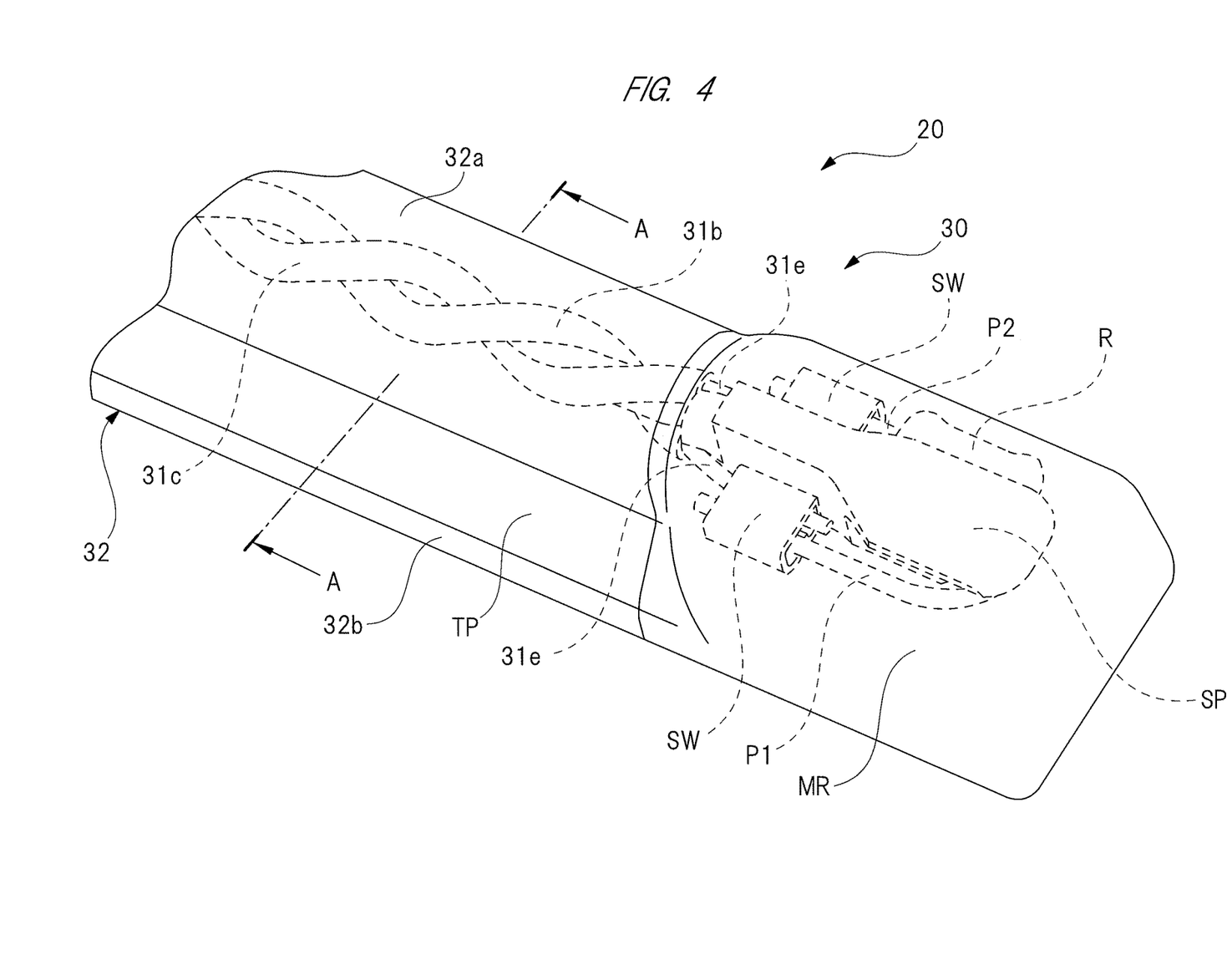
FIG. 4 is a perspective view showing a distal end side of the sensor body.
Figure 5:
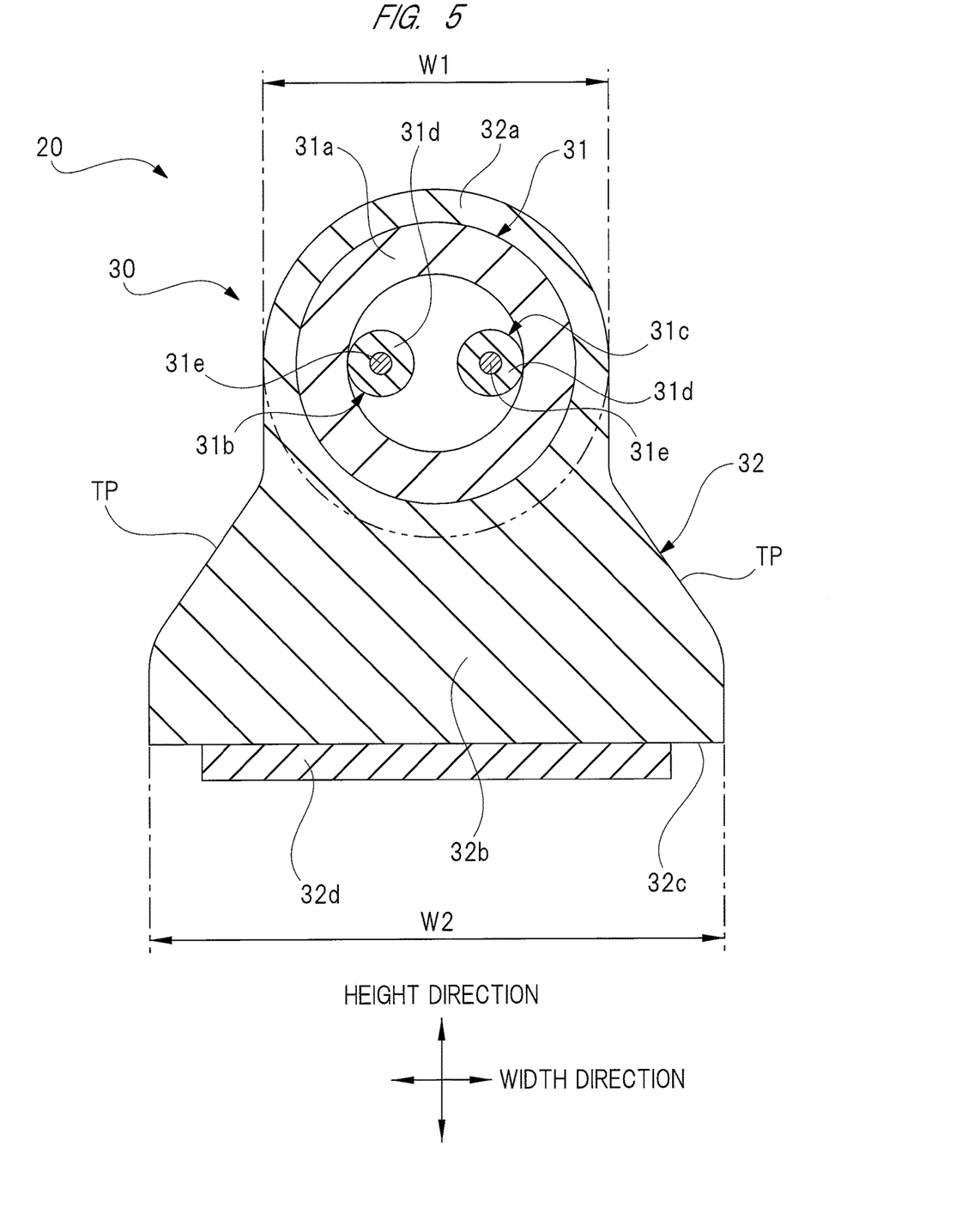
FIG. 5 is a sectional view taken along line A-A of FIG. 4.
Figure 6:
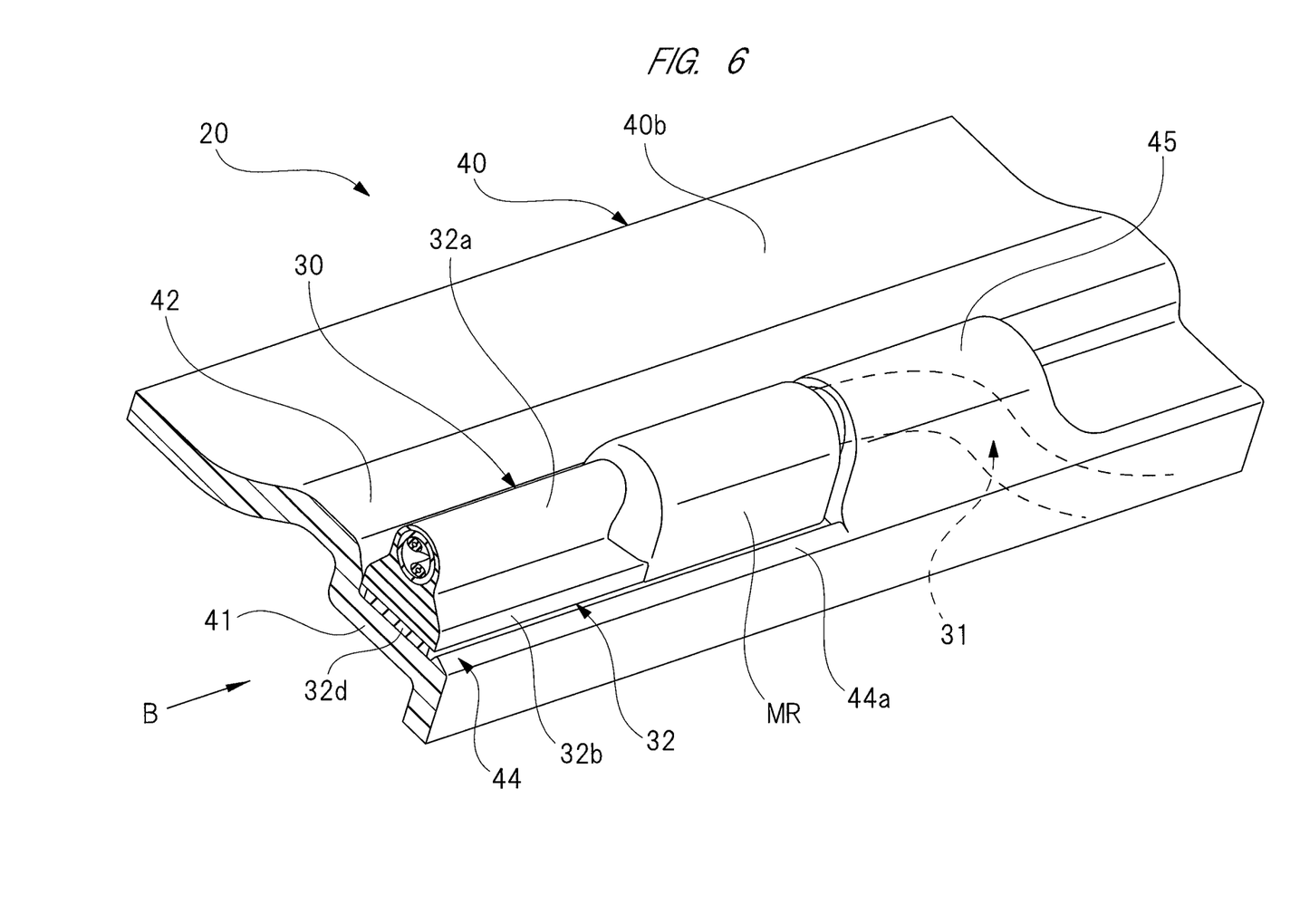
FIG. 6 is a perspective view showing a fixing structure of the sensor body for a bracket body.
Figure 7:
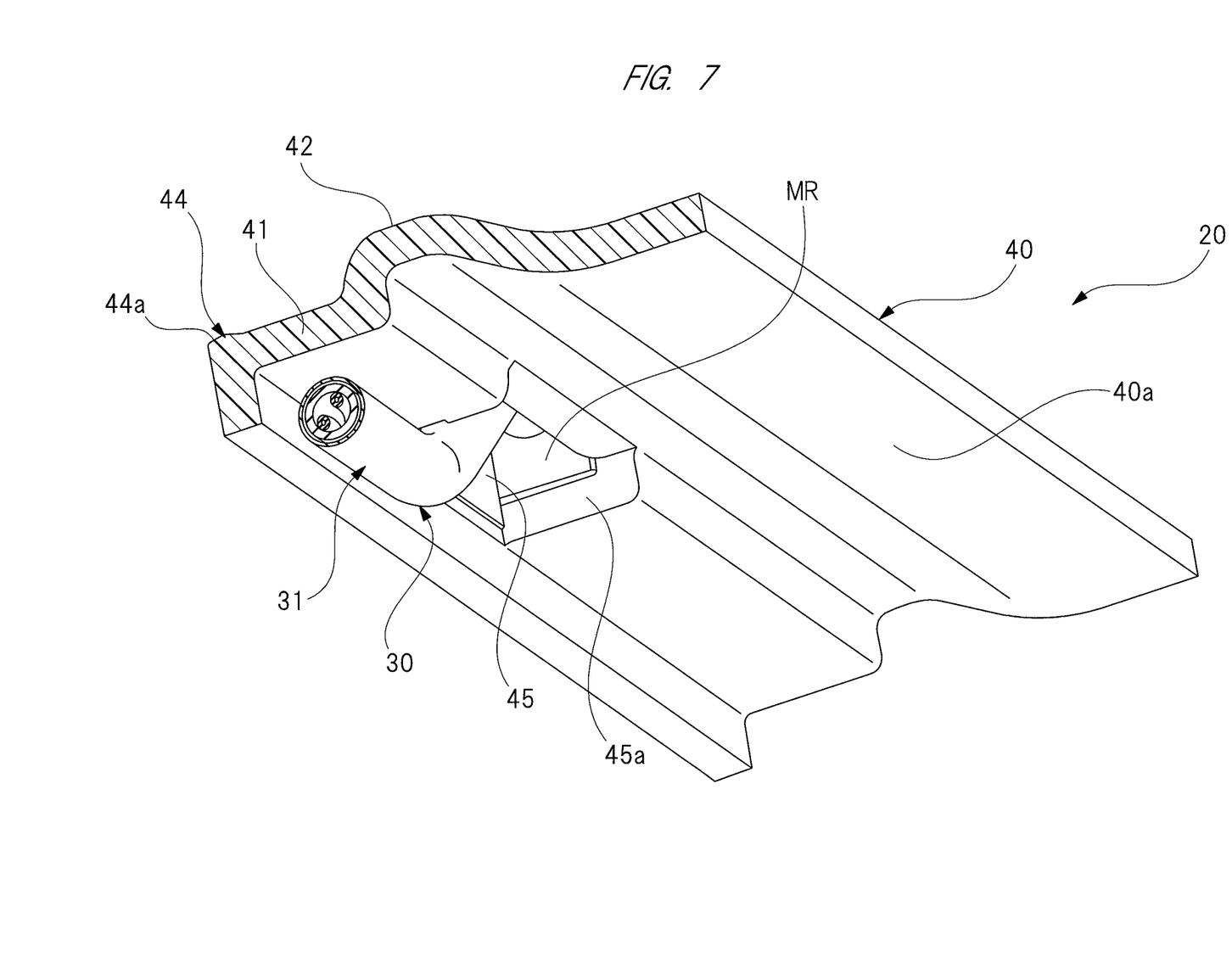
FIG. 7 is a perspective view showing the touch sensor unit in FIG. 6, from the rear side of the vehicle.
Figure 8:
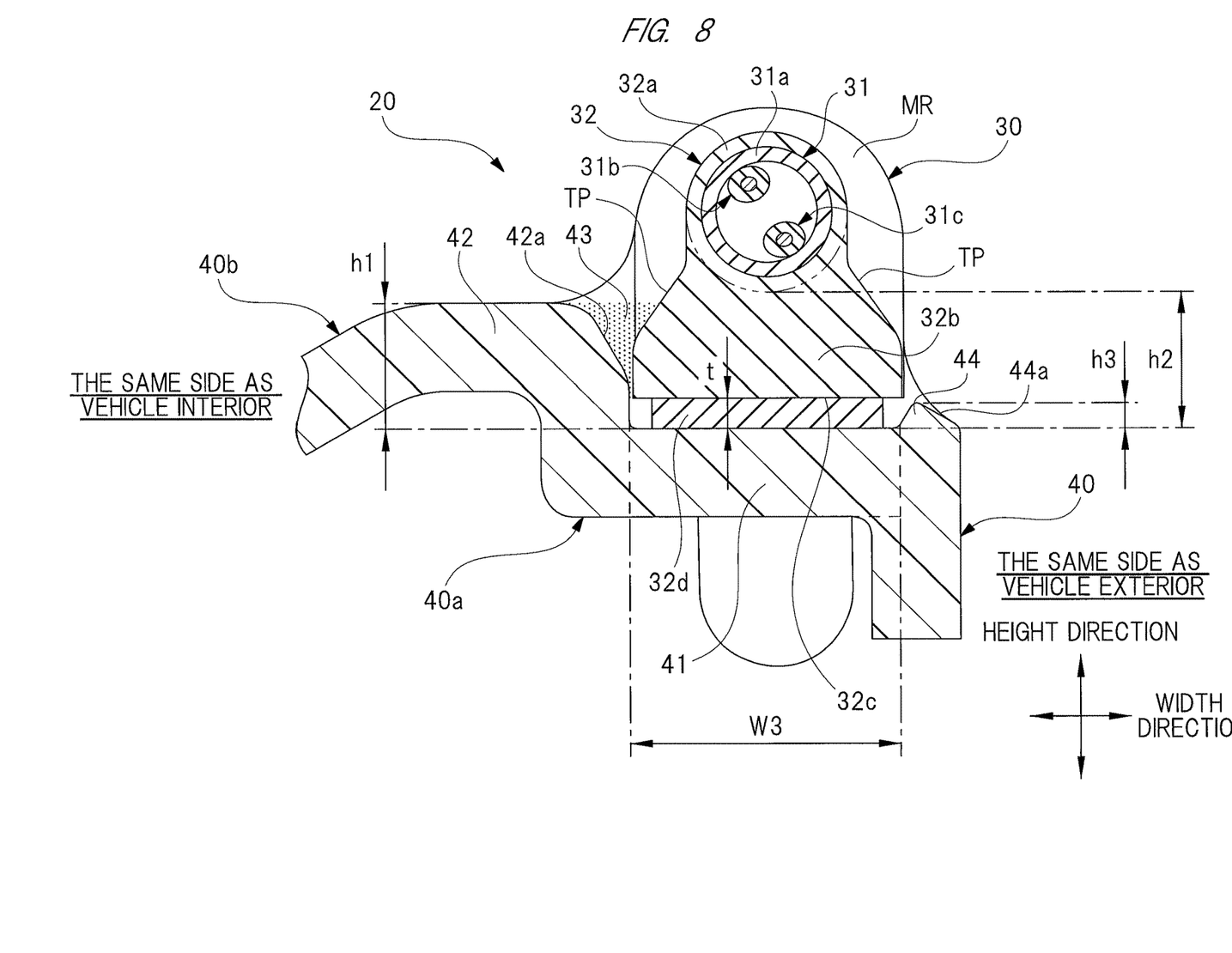
FIG. 8 is a view seen from an arrow "B" in FIG. 6.
Figure 9:
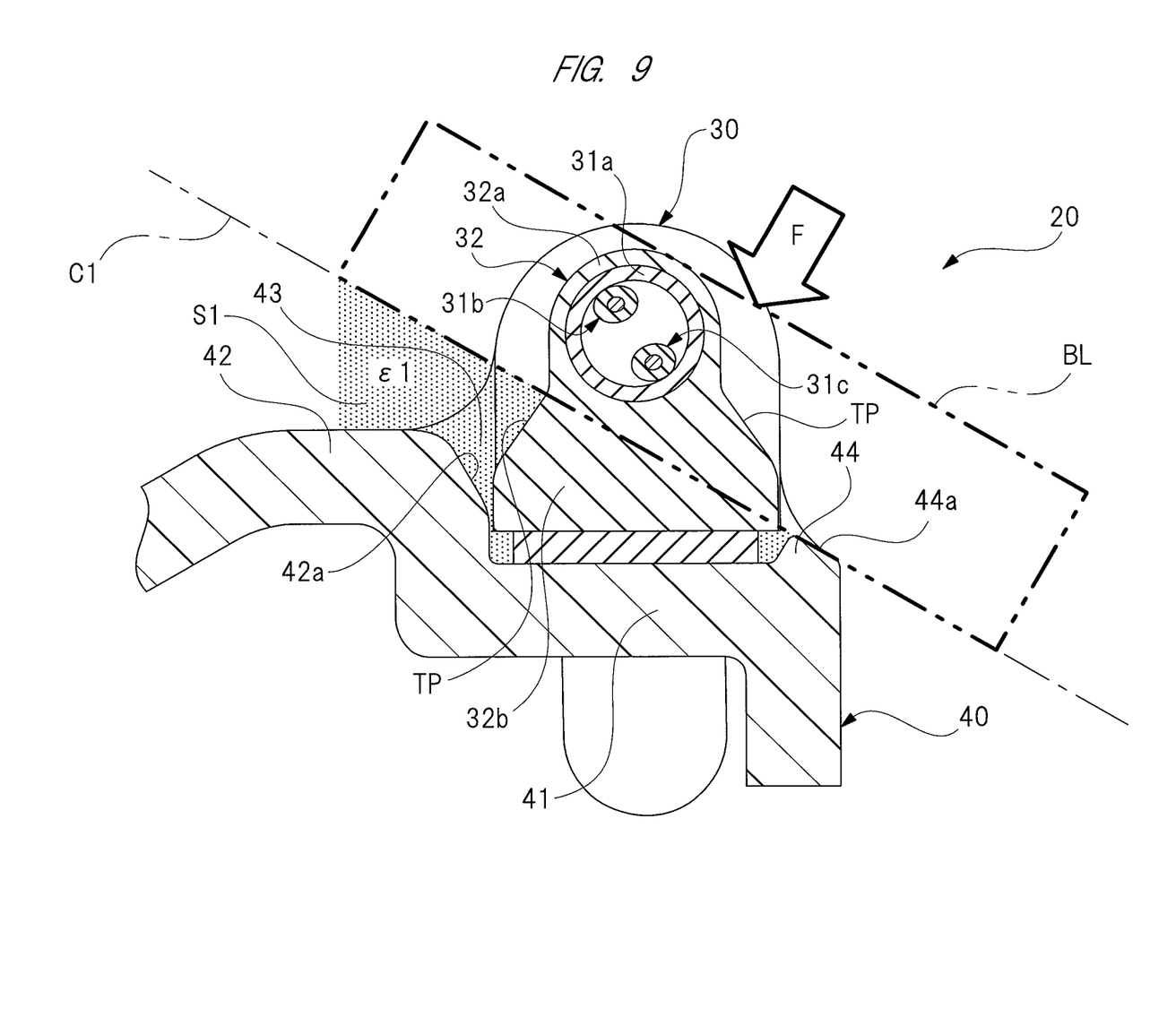
FIG. 9 is a view for explaining a case in which a load is applied to the sensor body from an oblique direction.
Figure 10:
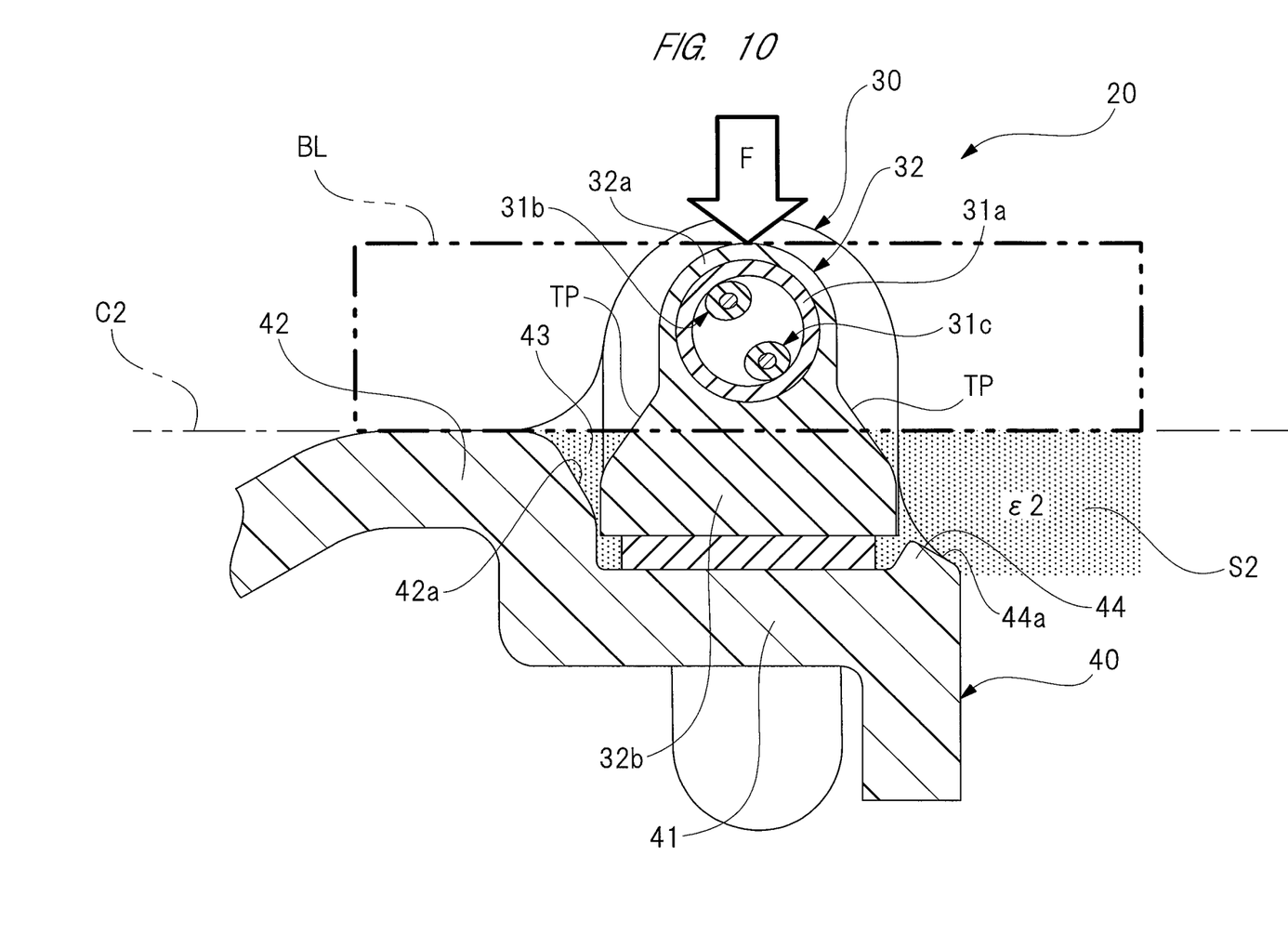
FIG. 10 is a view for explaining a case in which a load is applied to the sensor body from a vertical direction.
Figure 11:
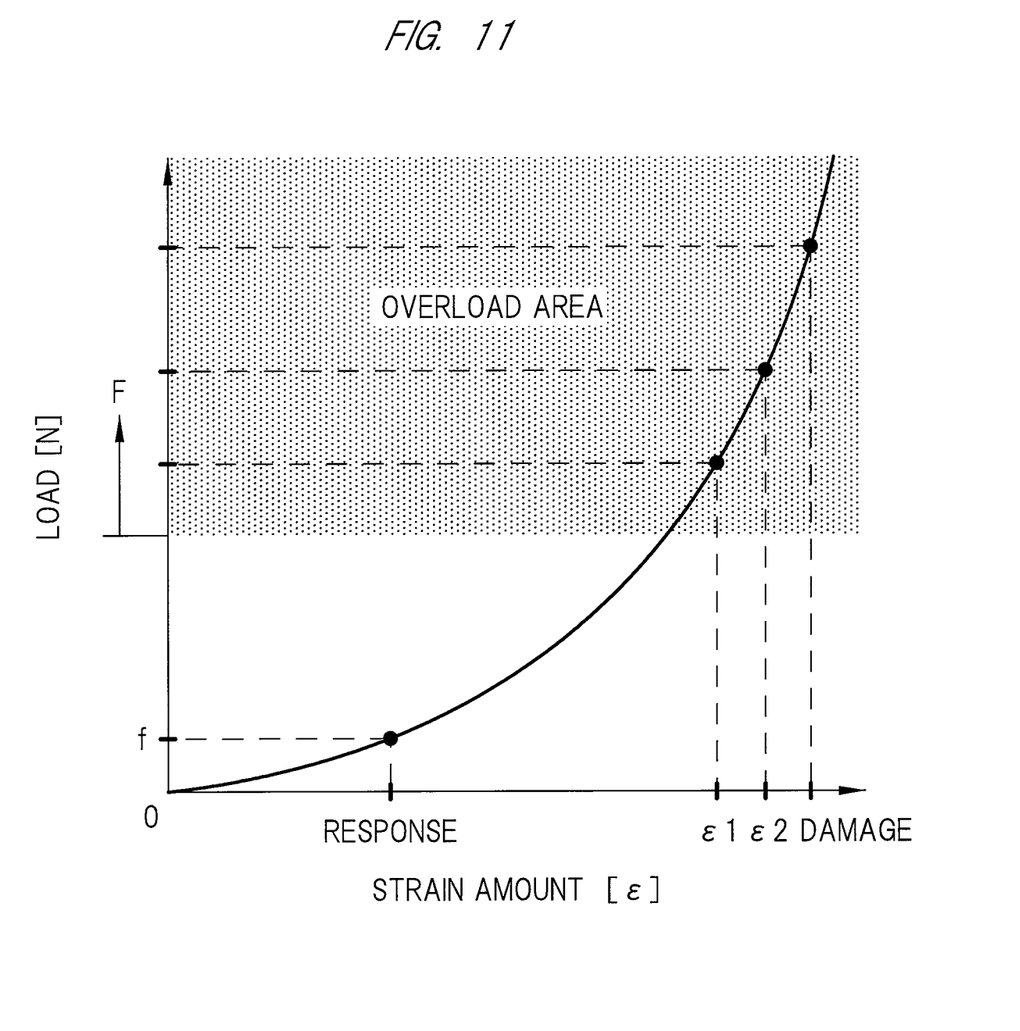
FIG. 11 is a graph for explaining why the touch sensor unit in the states shown in FIGS. 9 and 10 suffers no damage.

FIG. 1 is a front view of a tail gate including touch sensor units; FIG. 2 is a side view of a rear side of a vehicle in FIG. 1, from a lateral side of the vehicle; FIG. 3 is a perspective view showing a base end side of a sensor body; FIG. 4 is a perspective view showing a distal end side of the sensor body; FIG. 5 is a sectional view taken along line A-A of FIG. 4; FIG. 6 is a perspective view showing a fixing structure of the sensor body for a bracket body; FIG. 7 is a perspective view showing the touch sensor unit in FIG. 6, from the rear side; FIG. 8 is a view seen from an arrow B in FIG. 6; FIG. 9 is a view for explaining a case in which a load is applied to the sensor body from an oblique direction; FIG. 10 is a view for explaining a case in which a load is applied to the sensor body from a vertical direction; and FIG. 11 is a graph for explaining why the touch sensor unit in the states shown in FIGS. 9 and 10 suffers no damage.

A vehicle 10 shown in FIGS. 1 and 2 is of a so-called hatch back type. The vehicle 10 has an opening portion 11 formed on the rear side, which allows a large piece of baggage to be taken in and out of the vehicle interior. The opening portion 11 is opened and closed, as indicated by the solid line arrow and the broken line arrow in FIG. 2, with a tail gate (opening and closing element) 12 which pivots about a hinge (not shown) provided on the rear side of the ceiling portion of the vehicle 10.

A power tail gate apparatus 13 is mounted on the vehicle 10 according to this embodiment. The power tail gate apparatus 13 includes: an actuator 13a equipped with a decelerator, the actuator opening and closing the tail gate 12; a controller 13b which controls the actuator 13a on the basis of an operation signal from an operation switch (not shown); and a pair of touch sensor units 20 which detect the contact of a blockage BL.

As shown in FIG. 1, the touch sensor units 20 are respectively provided on both sides (right and left sides in FIG. 1) of the tail gate 12 as a "fixing object" in a width direction of the vehicle. More specifically, the pair of touch sensor units 20 are arranged along the curved shape of a door frame on the both sides of the tail gate 12 in the width direction. That is, the pair of touch sensor units 20 is formed into a curved state inconformity to the curved shape of the door frame, and are fixed, in the curved state, to the tail gate 12. Therefore, when the blockage BL comes into contact with the touch sensor units 20 between the opening portion 11 and the tail gate 12, the touch sensor units 20 are immediately deformed elastically.

Each touch sensor unit 20 is electrically connected to the controller 13b, and inputs, to the controller 13b, a detection signal generated by elastic deformation of the touch sensor unit 20. The controller 13b opens the tail gate 12 under closing operation or stops the tail gate 12 under closing operation on the spot, regardless of the operation of the operation switch, on the basis of the detection signal from each touch sensor unit 20. This prevents the blockage BL from being caught.

Here, As shown in FIG. 4, each touch sensor unit 20 is provided with a pair of electrodes 31b and 31c, and a resistor "R" is electrically connected to the distal end side (right side in FIG. 4) of the touch sensor unit 20. Therefore, when the touch sensor unit 20 is not elastically deformed, the pair of electrodes 31b and 31c is not in contact with each other, and the resistance value of the resistor R is input to the controller 13b. That is, when receiving the resistance value of the resistor R, the controller 13b determines that the blockage BL is not caught, and continues to close the tail gate 12.

On the other hand, when the blockage BL comes into contact with each touch sensor unit 20, and the touch sensor unit 20 is then elastically deformed, the pair of electrodes 31b and 31c comes into contact with each other to be short-circuited. A resistance value (infinite) is input to the controller 13b without via the resistor R. Therefore, the controller 13b detects a change in resistance value and executes control to open the tail gate 12 or stop the tail gate 12 on the spot in response to the change in resistance value as a "trigger".

As shown in FIGS. 3 to 8, each touch sensor unit 20 includes a sensor 30 formed into an elongated string-like shape and a sensor bracket 40 for fixing the sensor 30 to the tail gate 12 (see FIG. 1).

As shown in FIG. 5, each sensor 30 includes a sensor body 31 and a sensor holder 32 which holds the sensor body 31. In addition, as shown in FIG. 3, the base end sides of the pair of electrodes 31b and 31c are arranged on the base end side of the sensor 30, and the base end portions of the electrodes 31b and 31c are provided with a male connector 30a attached to a female connector (not shown) of the controller 13b.

As shown in FIG. 5, each sensor body 31 includes an insulating tube 31a formed of insulating rubber material or the like having flexibility. The insulating tube 31a is elastically deformable by an external load. The pair of electrodes 31b and 31c are helically fixed to the radial inner side (inside) of the insulating tube 31a. The electrodes 31b and 31c include conductive tubes 31d formed of conductive rubber or the like having flexibility, each accommodating a conductive line 31e formed from a bundle of a plurality of copper wires. As shown in FIG. 5, the inner diameter of the insulating tube 31a is almost three times the diameter of each of the electrodes 31b and 31c. That is, a gap almost corresponding to each of the electrodes 31b and 31c is formed between the electrodes 31b and 31c facing each other through the axis of the insulating tube 31a.

As described above, the electrodes 31b and 31c are arranged on the radial inner side of each insulating tube 31a at angular intervals of 180 degrees in the circumferential direction of the insulating tube 31a, and are helically fixed to the radial inner side in the longitudinal direction of the insulating tube 31a. Additionally, the gap almost corresponding to each of the electrodes 31b and 31c is formed between the electrodes 31b and 31c facing each other through the axis of the insulating tube 31a. This structure makes the electrodes 31b and 31c come into contact with each other and be short-circuited under almost the same condition (pressing force) regardless of the position in the circumferential direction of the sensor body 31 at which the blockage BL (see FIG. 1) comes into contact with the sensor body 31 to elastically deform it.

Here, in each touch sensor unit 20 used for the tail gate 12, the insulating tube 31a has a diameter of about 5 mm. Consequently, in consideration of the routing and detection sensitivity of the touch sensor unit 20 with respect to the tail gate 12, the pair of electrodes 31b and 31c, each having a diameter of about 1 mm, are preferably provided, in a helical fashion, inside the insulating tube 31a. For example, in this embodiment, even when the insulating tube 31a was wound on a columnar support having a radius of 4 mm, the electrodes 31b and 31c were not short-circuited. On the other hand, in a comparative example, when the same insulating tube 31a accommodating the same four electrodes arranged in parallel was wound on a columnar support having a radius of 7.5 mm, the respective electrodes were short-circuited. In other words, the embodiment using the former structure can cope with the door frame of the tail gate 12 with curved shape having any angles from acute angles to obtuse angles.

As shown in FIGS. 4 and 5, each sensor holder 32 is formed into an elongated shape by, for example, extrusion of an insulating rubber material having flexibility. The sensor holder 32 includes a hollow sensor portion 32a internally holding the sensor body 31, and a base portion 32b fixed to a bracket body 41 of the sensor bracket 40 (see FIG. 8). Note that the two-dot chain line in FIG. 5 indicates the boundary portion between the sensor portion 32a and the base portion 32b.

Each sensor portion 32a extending along a direction (transverse direction) intersecting with the longitudinal direction of the sensor holder 32 has an almost semicircular cross-sectional shape. The wall thickness of the sensor portion 32a is smaller than that of the insulating tube 31a. That is, the sensor portion 32a can easily deform elastically upon receiving an external load. Consequently, the elastic deformation of the sensor portion 32a can cause the electrodes 31b and 31c held by the sensor portion 32a via the insulating tube 31a to easily come into contact with each other, thereby ensuring sufficient detection performance of the sensor body 31.

The base portion 32b is integrally provided to the sensor portion 32a and extends along its longitudinal direction, and the base portion 32b has a function of fixing the sensor portion 32a to the bracket body 41. That is, the base portion 32b forms an "elastic base portion" in the present invention. The base portion 32b has an almost trapezoidal cross-sectional shape along the transverse direction of the sensor holder 32. A double-sided adhesive tape (adhesive tape) 32d is bonded to a bottom surface 42a of the base portion 32b to fix the sensor holder 32 to the bracket body 41.

As shown in FIG. 5, when the up-and-down direction in FIG. 5 is the height direction, the sensor portion 32a and the base portion 32b are stacked on each other in the height direction. When the lateral direction in FIG. 5, which intersects with the height direction, is the widthwise direction, a width W1 of the sensor portion 32a is smaller than a width W2 of the base portion 32b (W1<W2).

The sensor portion 32a and the base portion 32b are coupled to each other through a pair of inclined surfaces TP so as to be smoothly coupled to each other. Providing the inclined surfaces TP between the sensor portion 32a and the base portion 32b in this manner prevents cracking or the like between the sensor portion 32a and the base portion 32b which is caused when stress focuses between them. This improves the durability of the sensor holder 32.

As described above, each sensor holder 32 has a noncircular cross-sectional shape in a direction (transverse direction) intersecting with the longitudinal direction of the sensor body 31 (insulating tube 31a). This facilitates the elastic deformation of the sensor portion 32a and makes the base portion 32b have sufficient rigidity, thereby ensuring the fixing strength with which the sensor portion 32a is fixed to the bracket body 41 with the double-sided adhesive tape 32d.

Here, as shown in FIG. 4, the distal end side of each touch sensor unit 20 is provided with a separator SP made of insulating material, the single resistor R, and two caulking members SW. The separator SP, the resistor R, and the caulking members SW are buried in a mold resin MR by insert molding.

Two ends of each resistor R are respectively provided with a long connecting portion P1 and a short connecting portion P2. The long connecting portion P1 is folded through an angle of 180 degrees with respect to the short connecting portion P2 to electrically connect the long connecting portion P1 and the short connecting portion P2 to the conductive lines 31e (see FIG. 5) of the electrodes 31b and 31c, respectively, with the caulking members SW. In this manner, the ends of the electrodes 31b and 31c are electrically connected to each other via the resistor R.

Note that since each caulking member SW is caulked by a caulking tool (not shown) such as lineman's pliers, the resistor R is firmly, electrically connected to the conductive lines 31e of the electrodes 31b and 31c. The caulking members SW are symmetrically arranged on respective sides of the separator SP so as to be prevented from being short-circuited to each other at the corresponding portion of the separator SP.

As shown in FIGS. 6 to 8, each sensor bracket 40 is formed into an almost plate-like shape which includes a plurality of flexed portions by extrusion of resin material such as plastic. That is, the hardness of the sensor bracket 40 is set to be higher than that of the sensor 30. The sensor bracket 40 includes a rear surface portion 40a to which the tail gate 12 (see FIG. 1) is fixed and an front surface portion 40b to which the sensor 30 is fixed. Here, the sensor bracket 40 is fixed to the tail gate 12 with a fixing claw (not shown) formed on the rear surface portion 40a, a double-sided adhesive tape (not shown) bonded to the rear surface portion 40a, or the like.

The sensor bracket 40 includes a flat bracket body 41 on which the base portion 32b of the sensor 30 is mounted. While the sensor bracket 40 is fixed to the fixing surface (not shown) of the tail gate 12, the bracket body 41 extends along the elongating direction of the fixing surface of the tail gate 12.

As shown in FIG. 8, a width W3 of the bracket body 41 along a direction intersecting with the longitudinal direction of the sensor 30 is almost equal to the width W2 (see FIG. 5) of the base portion 32b (W3≈W2). This facilitates positioning the sensor 30 to the bracket body 41. That is, a portion surrounded by the broken lines in FIG. 8 is used as the bracket body 41, which forms an attachment body and a bracket according to the present invention. The bottom surface 32c of the base portion 32b is fixed to the front surface portion 40b of the bracket body 41 through a double-sided adhesive tape 32d.

A first protruding portion 42 is integrally formed on one side (left side in FIG. 8) of the bracket body 41 along the widthwise direction. The first protruding portion 42 protrudes toward the same side as the front surface portion 40b, on which the sensor 30 is disposed. In this case, the first protruding portion 42 forms one side protruding portion according to the present invention, and is disposed on the vehicle interior side (one side) of the base portion 32b of the sensor 30.

The first protruding portion 42 has a height h1, and more specifically, the height from the bracket body 41 to the distal end of the first protruding portion 42 is the height h1. The height h1 of the first protruding portion 42 is set to be smaller than a height h2 from the bracket body 41 to the sensor portion 32a (h1<h2). This makes the sensor 30 reliably react (reliably short-circuit the electrodes 31b and 31c to each other) before the blockage BL (see FIG. 2) comes into contact with the first protruding portion 42. In other words, by providing the first protruding portion 42 as in this embodiment, the sensitivity of the sensor 30 is not decreased.

Additionally, a gap portion 43 is formed between the first protruding portion 42 and the base portion 32b, as indicated by the hatched portion in FIG. 8. Here, the gap portion 43 is formed by providing an inclined portion 42a on same side as the base portion 32b of the first protruding portion 42 and providing the inclined surface TP on same side as the first protruding portion 42 of the base portion 32b. When the sensor portion 32a and the base portion 32b are elastically deformed upon contact of the blockage BL, the elastically deformed sensor portion 32a and base portion 32b enter the gap portion 43. At this time, the elastically deformed sensor portion 32a and base portion 32b gently come into contact with the inclined portion 42a of the first protruding portion 42. This can protect the sensor holder 32 by preventing stress from focusing on either of the sensor portion 32a and the base portion 32b.

A second protruding portion 44 is integrally provided to the other side (right side in FIG. 8) of each bracket body 41 along the widthwise direction. Like the first protruding portion 42, the second protruding portion 44 protrudes toward the side (the same side as the front surface portion 40b) on which the sensor 30 is disposed. Here, the second protruding portion 44 forms a protruding portion on the other side according to the present invention, and is disposed on the vehicle exterior side (the other side) of the base portion 32b of the sensor 30.

The second protruding portion 44 has a height h3, and more specifically, the height h3 is set to be almost equal to a thickness "t" of the double-sided adhesive tape 32d bonded to the bracket body 41 (h3≈t). That is, the height h1 of the first protruding portion 42 is set to be larger than the height h3 of the second protruding portion 44 (h1>h3). This enables the sensor 30 to reliably react, like the function and effect of the first protruding portion 42, and can make it difficult for the blockage BL to come into contact with the sensor bracket 40, thereby preventing it from being damaged by the blockage BL.

In addition, a tapered surface 44a is provided on the distal end of each second protruding portion 44. The tapered surface 44a is inclined downward in a slide form toward the vehicle exterior side. In other words, the tapered surface 44a is inclined from the vehicle exterior side of the second protruding portion 44 to the distal end side of the first protruding portion 42. With this structure, as shown in FIG. 9, a first imaginary line C1 passing over the tapered surface 44a is inclined from the vehicle exterior side of the second protruding portion 44 toward the distal end side of the first protruding portion 42. Accordingly, for example, the blockage BL having an almost rectangular cross section like that shown in FIG. 9 can be inclined along the tapered surface 44a.

As shown in FIGS. 6 and 7, each sensor bracket 40 is integrally provided with an extraction portion 45 which extracts the base end side (see FIG. 3) of the sensor body 31 from the same side as the front surface portion 40b to the same side as the rear surface portion 40a. Here, mold resin MR having almost the same shape as that of the distal end side of the sensor 30 is provided to the base end side of the sensor 30, and the extraction portion 45 is formed into almost the same shape as that of the mold resin MR provided to the base end side of the sensor 30. This structure covers and hides the base end side of the sensor body 31 while improving the design property.

In addition, as shown in FIG. 7, a communication hole 45a is formed in the inside of the extraction portion 45 so as to cause the front surface portion 40b and the rear surface portion 40a of the sensor bracket 40 to communicate with each other. The base end side of the sensor body 31 is extracted from the same side as the front surface portion 40b to the same side as the rear surface portion 40a through the communication hole 45a. The base end side of the sensor body 31 extracted from the communication hole 45a is introduced into the vehicle through a grommet GM (see FIG. 3) mounted in an insertion hole provided in the tail gate 12 (see FIG. 1).

Next, the operation of each touch sensor unit 20 formed in the above manner will be described with reference to the accompanying drawings. The caught state of the blockage BL, in particular, will be described in detail with reference to FIGS. 9 to 11.

When the blockage BL lightly touches the sensor 30 of the touch sensor unit 20, a relatively light load "f" is applied to the sensor 30, as shown in FIG. 11. A portion of the sensor portion 32a of the sensor holder 32 is then elastically deformed. This causes the electrodes 31b and 31c (see FIG. 5) provided inside the insulating tube 31a to short-circuit upon coming into contact with each other. As described above, in the touch sensor unit 20 according to this embodiment, a portion of the sensor portion 32a can deflect by a predetermined distortion amount with the relatively light load "f". This can eventually improve the reaction sensitivity of the sensor 30.

Next described is a case in which the blockage BL having an almost rectangular cross section strikes the sensor 30 of each touch sensor unit 20 from obliquely above the sensor bracket 40, and the caught state detecting operation of the power tail gate apparatus 13 (see FIG. 1) (for example, the reversing operation of the actuator 13a) is stopped, as shown in FIG. 9.

When the blockage BL strikes the sensor 30 from obliquely above, the entire sensor holder 32 including the sensor portion 32a and the base portion 32b is elastically deformed by a relatively heavy load F (overload) (F>f). Subsequently, as the entire sensor holder 32 is further elastically deformed, the blockage BL abuts on the tapered surface 44a of the second protruding portion 44. The blockage BL is then inclined along the tapered surface 44a (first imaginary line C1). In this state, the movement of the blockage BL relative to the touch sensor unit 20 is stopped. FIG. 9 shows this state.

At this time, as shown in FIG. 11, the sensor holder 32 is elastically deformed by a distortion amount ε1 in the overload region (hatched range in FIG. 11). The elastically deformed sensor holder 32 enters a space S1 corresponding to the hatched portion in FIG. 9 including the gap portion 43. Here, the elastically deformed sensor holder 32 gently comes into contact with the inclined portion 42a of the first protruding portion 42, and the inclined surface TP is provided to the sensor holder 32 itself. Accordingly, the stress loaded on the sensor holder 32 is dispersed over a wide range on the sensor holder 32 itself. This can prevent the stress from focusing on a predetermined portion of the sensor holder 32.

As shown in FIG. 9, therefore, even if the blockage BL strikes the sensor 30 from obliquely above and the relatively heavy load F (overload) is applied on the sensor 30, it is possible to prevent the touch sensor unit 20 from being damaged.

The following is a case in which the blockage BL having an almost rectangular cross section strikes the sensor 30 of each touch sensor unit 20 from directly above the sensor bracket 40, and the caught state detecting operation of the power tail gate apparatus 13 is stopped, as shown in FIG. 10.

When the blockage BL strikes the sensor 30 from directly above, the entire sensor holder 32 including the sensor portion 32a and the base portion 32b is elastically deformed by the relatively heavy load F (overload) (F>f). Subsequently, as the entire sensor holder 32 is further elastically deformed, the blockage BL abuts on the distal end of the first protruding portion 42. The blockage BL becomes parallel to the bracket body 41 in conformity to the distal end of the first protruding portion 42 (second imaginary line C2). In this state, the movement of the blockage BL relative to the touch sensor unit 20 is stopped. FIG. 10 shows this state.

At this time, as shown in FIG. 11, the sensor holder 32 is elastically deformed by a distortion amount ε2 (ε2>ε1) in the overload region. A portion of the elastically deformed sensor holder 32 enters the gap portion 43 (hatched portion on the left side in FIG. 1), and the remaining portion escapes into a space S2 corresponding to the hatched portion on the right side in FIG. 10. Here, as in the case shown in FIG. 9, the stress loaded on the sensor holder 32 is dispersed over a wide range on the sensor holder 32 itself. This can prevent the stress from focusing on a predetermined portion of the sensor holder 32.

As shown in FIG. 10, therefore, even if the blockage BL strikes the sensor 30 from directly above and the relatively heavy load F (overload) is applied on the sensor 30, it is possible to prevent the touch sensor unit 20 from being damaged.

Note that the distortion amount ε1 of the sensor holder 32 caused when the blockage BL abuts on the tapered surface 44a of the second protruding portion 44 (see FIG. 9) and the distortion amount ε2 of the sensor holder 32 caused when the blockage BL abuts on the distal end of the first protruding portion 42 (see FIG. 10) are set to be smaller than a distortion amount large enough to damage the touch sensor unit 20, as shown in FIG. 11.

Each touch sensor unit 20 according to this embodiment, therefore, prevents damage to itself even if the relatively heavy load F (overload) is applied on the touch sensor unit 20, as shown in FIGS. 9 and 10.

As described in detail above, according to this embodiment, the bracket body 41 is provided with the first protruding portion 42 provided in the vehicle interior side of the base portion 32b and the gap portion 43 between the first protruding portion 42 and the base portion 32b, and the height h1 from the bracket body 41 to the distal end of the first protruding portion 42 is smaller than the height h2 from the bracket body 41 to the sensor portion 32a.

Therefore, when the sensor portion 32a and the base portion 32b are elastically deformed by contact with the blockage BL, the elastically deformed sensor portion 32a and base portion 32b enter the gap portion 43. This can prevent the sensor portion 32a and the base portion 32b from being pressed against the corner portion of the bracket as in the above case without increasing the rigidity of the sensor portion 32a and the base portion 32b.

It is therefore possible to prevent damage to the sensor portion 32a and the base portion 32b, and to prolong the service life of the touch sensor unit 20 without decreasing the sensitivity.

Additionally, according to this embodiment, the width W1 of the sensor portion 32a along the direction intersecting with the height direction of the first protruding portion 42 is smaller than the width W2 of the base portion 32b along the direction intersecting with the height direction of the first protruding portion 42, and the inclined surface TP is provided between the sensor portion 32a and the base portion 32b.

Therefore, when the sensor holder 32 is elastically deformed, this structure can prevent cracking or the like between the sensor portion 32a and the base portion 32b which is caused when stress focuses between them. This can improve the durability of the sensor holder 32.

Furthermore, according to this embodiment, in comparison with the base portion 32b, the second protruding portion 44 is provided to the vehicle exterior side of the bracket body 41, and the height h1 of the first protruding portion 42 is larger than the height h3 of the second protruding portion 44.

This can make the sensor 30 reliably respond, and at the same time, make it difficult for the blockage BL to come into contact with the sensor bracket 40. It is therefore possible to prevent damage from the blockage BL.

Additionally, according to this embodiment, the distal end of the second protruding portion 44 is provided with the tapered surface 44a inclined from the vehicle exterior side of the second protruding portion 44 toward the distal end side of the first protruding portion 42.

Therefore, as shown in FIG. 9, for example, the blockage BL having an almost rectangular cross section is inclined along the tapered surface 44a to prevent the sensor holder 32 from being further elastically deformed. This can protect the sensor 30 from the load F (overload).

Furthermore, obviously, the present invention is not limited to each embodiment described above and can be variously changed without departing from the scope of the invention. For example, each embodiment described above has exemplified the structure having the pair of electrodes 31b and 31c helically fixed inside the insulating tube 31a. However, the present invention is not limited to this structure, and can also be configured to provide, for example, four or six electrodes in a helical state in accordance with the thickness of each electrode or the required detection performance.

Additionally, each embodiment described above has exemplified the case in which the touch sensor unit 20 is attached to the tail gate 12 of the vehicle 10. However, the present invention is not limited to this, and such a touch sensor unit can be attached to the sliding roof or the sliding doors on the lateral sides of the vehicle. Furthermore, such a touch sensor unit can be attached to, for example, an automatic door which opens and closes a doorway of a building as well as an opening and closing element provided for the vehicle.

Furthermore, the above embodiment has exemplified the case in which the touch sensor unit 20 is fixed to the tail gate 12 through the sensor bracket 40. However, the present invention is not limited to this, and the tail gate itself may be provided with a first protruding portion as "one side protruding portion" and a second protruding portion as "the other side protruding portion". In this case, the sensor bracket 40 can be omitted. Note that in this case, the touch sensor unit according to the present invention includes the first and second protruding portions provided to the tail gate.

In addition, Material, shape, dimension, number, installation position, and others of each constructional element of each embodiment described above can be arbitrarily determined as long as the present invention can be implemented, and are not limited to those of the above embodiments.

What is claimed is:

1. A touch sensor unit which is used for detection of contact with a blockage, comprising:
    a hollow sensor portion which is elastically deformed by an external load;
    electrodes which are provided inside the sensor portion, and brought into contact with each other by elastic deformation of the sensor portion;
    an elastic base portion having an almost trapezoidal cross-sectional shape, whose upper surface is integrally provided with the sensor portion, the elastic base portion extending along a longitudinal direction of the sensor portion;
    an attachment body to which a bottom surface of the elastic base portion is attached via an adhesive tape;
    a protruding portion provided to the attachment body and disposed on one side of the elastic base portion, the protruding portion protruding toward the same side on which the sensor portion is disposed in a direction of a height of the sensor portion so as to be larger than a thickness of the adhesion tape from the attachment body; and
    a gap portion provided between the protruding portion and the elastic base portion,
    wherein (i) the sensor portion and the elastic base portion do not enter the gap portion when the sensor portion and the elastic base portion are not elastically deformed, and (ii) the sensor portion and the elastic base portion, enter the gap portion when the sensor portion and the base portion are elastically deformed, and
    wherein a height from the attachment body to a distal end of the protruding portion is smaller than a height from the attachment body to the sensor portion.

2. The touch sensor unit according to claim 1, wherein
    a width of the sensor portion along a direction intersecting with a height direction of the protruding portion is smaller than a width of the elastic base portion along a direction intersecting with the height direction of the protruding portion, and
    an inclined surface is provided between the sensor portion and the elastic base portion.

3. The touch sensor unit according to claim 1, wherein the attachment body is a bracket which is fixed to a fixing object.

4. The touch sensor unit according to claim 1, wherein
    a fixing object is a vehicle body or an opening and closing element of a vehicle, and
    a protruding portion is provided on the other side of the elastic base portion of the attachment body, the protruding portion on one side is disposed on a vehicle interior side, and the protruding portion on the other side is disposed on a vehicle exterior side, and the protruding portion on one side is larger in height than the protruding portion on the other side.

5. The touch sensor unit according to claim 4, wherein a distal end of the protruding portion on the other side is provided with a tapered surface inclined from the vehicle exterior side of the protruding portion on the other side toward a distal end side of the protruding portion on one side.

* * * * *